Patented July 24, 1951

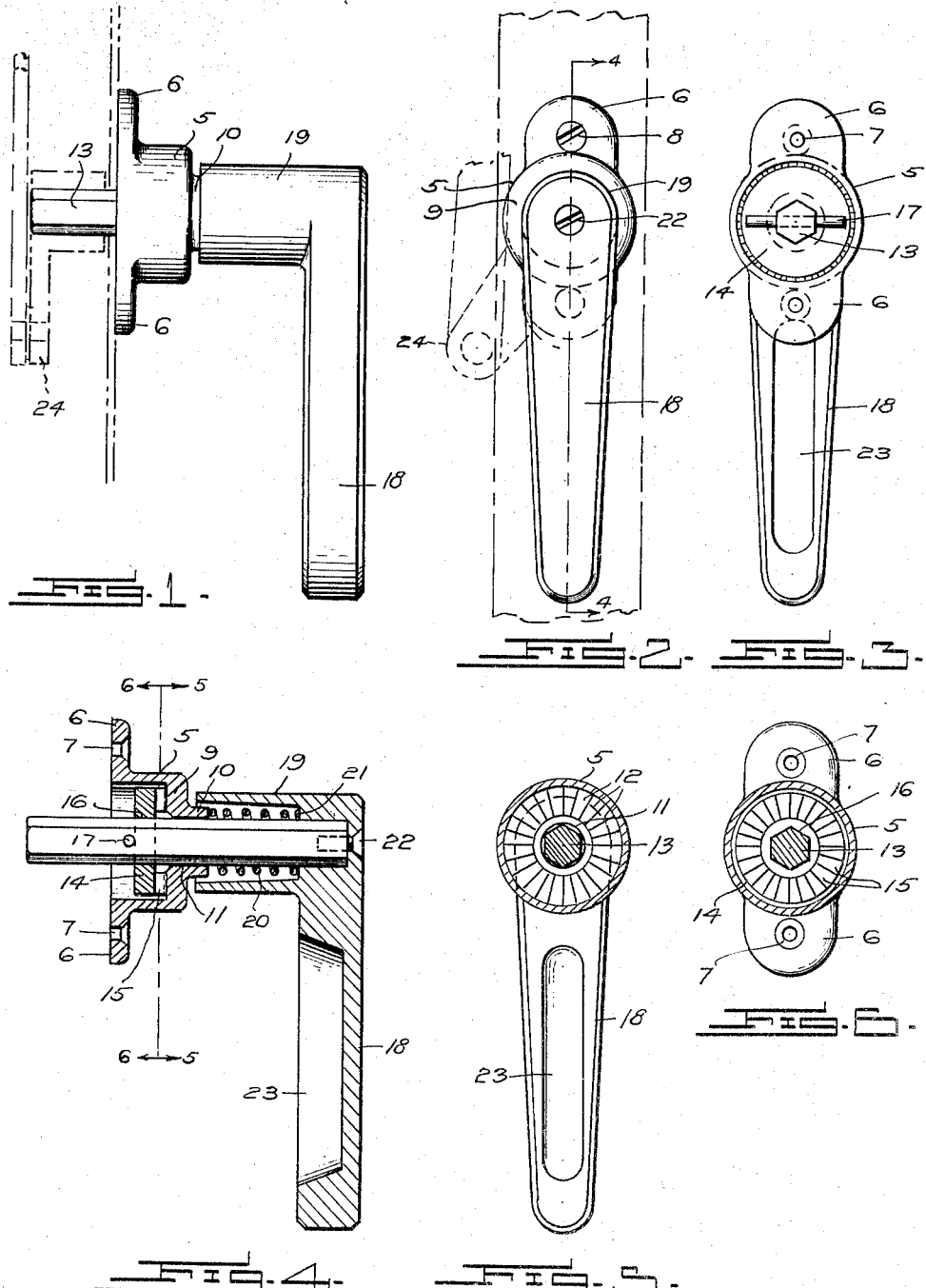

2,561,482

UNITED STATES PATENT OFFICE 2,561,482

MOTION CONTROLLED BRAKED OPERATOR

Abraham W. Schostak, Miami, Fla.

Application May 31, 1949, Serial No. 96,169

3 Claims. (Cl. 74—528)

This invention relates broadly to clutched hand operators for imparting rotative motion.

It is an object of the present invention to provide a hand operator for transmitting link or rotative motion, having automatic braking means for retaining the operator and associated controlled mechanism in predetermined adjusted position.

A further object of the invention resides in a novel axially shiftable brake mechanism controllable under the influence of a hand crank rotatable throughout a full 360 degrees for shifting or rotating any mechanism to be controlled, such as link operators for closure louvers, shaft operators and many other devices requiring a simplified motion controlling device having a brake.

Another object of the invention resides in the novel construction of the operator, having a fixed housing equipped with slip type clutch teeth and an axially shiftable shaft carrying a co-acting brake member and a hand crank for rotating the shaft and causing slippage of the clutch in either direction, with spring means to retain the clutch elements in engaged position upon release of the hand crank.

Other important objects and advantages of the invention will be readily apparent during the course of the following description, reference being had to the accompanying drawings wherein is illustrated a preferred exemplification of the operator and wherein like characters of reference refer to like parts throughout the several views.

In the drawings:

Figure 1 is a side elevation of an operator constructed in accordance with the invention, Figure 2 is a front elevation thereof, Figure 3 is a rear elevation thereof, Figure 4 is a vertical sectional view taken on line 4—4 of Figure 2, Figure 5 is a transverse section taken on line 5—5 of Figure 4, and Figure 6 is a transverse section taken on line 6—6 of Figure 4.

Referring specifically to the drawings, the numeral 5 designates a brake housing, formed of any desirable material, such as metal, plastic or the like. The housing 5 is equipped with oppositely extending attaching plates 6, preferably formed integral therewith and the plates 6 are provided with openings 7 for the passage of fastening devices 8, such as screws, bolts or the like. The housing 5 is tubular, as shown and is formed open at its rear side. The transverse forward wall 9 of the housing is provided with an extended bearing projection 10 and a centrally arranged cylindrical opening is formed therethrough, open at both ends, as indicated at 11. The inner portion of the wall 9 is provided with a plurality of integral V-shape brake teeth 12, radially disposed entirely therearound.

Rotatably disposed in the cylindrical opening 11 and projecting beyond the bearing 10 and beyond the housing 5, is a preferably hexagonal shaft 13. The shaft 13 supports a co-acting brake disc 14, provided with V-shape teeth 15, radially disposed and of a number corresponding to the teeth 12. The disc is provided with a hexagonal, centrally disposed opening 16 for engagement over the shaft 13 and through the medium of which the disc is caused to rotate with the shaft. A cross pin 17, fitted through a drilled opening in the shaft limits the axial movement of the disc upon the shaft.

A hand crank 18, provided with a tubular head 19 at right angle thereto, engages over the forward extended end of the shaft 13 and overlies the extended bearing 10. The opening of the tubular head is preferably tapered and open at its outer end, for the reception of a compressible brake spring 20. The spring bears against the outer end of the bearing 10 and against an inner end wall 21 of the crank head. The end wall 21 is provided with a centrally disposed axial hexagonal recess for the reception of the free end of the shaft 13. A set screw 22, passing through a preformed opening in the outer extremity of the head 19, engages in a threaded opening formed in the end of the shaft 13, thus locking the shaft and crank head together in a unitary structure to be rotated under the influence of the hand crank 18. The crank 18 is preferably cut-away, as at 23, for reduction of weight and cost of manufacture.

Any form of mechanism to be controlled by the brake crank is secured the opposite extended end of the shaft 13, such for instance as a crank 24, illustrated in dotted lines in Figures 1 and 2. Link means may be connected to the crank 24 for the control of louver closures or for imparting motion to other devices. Straight line or flexible shafts may also be connected with and controlled by the braked crank operator.

In the use of the device, the shaft 13, carrying the disc 14, is passed through the opening 11 of the bearing 10 until the teeth of the disc and the teeth of the housing are engaged. Spring 20 is then slipped over the extended end of the shaft and the head 19 engaged thereover with the free end of the shaft seating in the hexagonal opening of the head. The set screw 22 is then engaged and the parts locked in rotative engagement with each other. The spring 20 having been compressed during the assembly, the tendency thereof will be to shift the shaft 13 forwardly to firmly engage the teeth 12 and 15. Rotation of the crank 18 causes the shaft to revolve and the brake teeth 12 and 15 to slip with respect to each other, with the spring 20 presenting a constant brake engagement. The axial movement of the shaft under the influence of the brake slippage during rotation is constantly being urged forward by the spring and the spring is of sufficient strength to maintain the brake in engaged position at any point of adjustment.

It will be apparent from the foregoing, that a very simple and effective brake operator has been provided. The device is capable of actuating many forms of mechanism where motion is required in varying degrees and will effectively hold such mechanisms in their adjusted positions. The device is easy to assemble and can be readily mounted in any desirable position, such for instance as that shown in Figure 2 in dotted lines, representing a channel member of a louver frame. The device is cheap to manufacture, is strong, durable and highly efficient in use.

It is to be understood, that the invention is not limited to the precise arrangement shown, but that it includes within its purview, whatever changes fairly come within either the terms or the spirit of the appended claims.

Having described my invention, what I claim is:

1. A braked operator comprising a tubular housing open at its rear and having a recessed inner end wall, an attaching plate formed on the housing for rigid mounting, a centrally arranged and forwardly extending cylindrical bearing formed on the housing and open at both ends, V-shaped clutch teeth formed on the inner recessed wall of the housing and radially disposed with respect to the bearing, a hexagonal shaft extending through the housing and rotatable in the bearing, said shaft extending forwardly and rearwardly of the housing, a brake disc positioned on the shaft and rotatable therewith, the disc being wholly positioned in the housing, radially disposed brake teeth formed on the disc similar in shape and number to the teeth of the housing for constant interlocking engagement therewith, the shaft and disc adapted to shift axially of the housing for a slipping of the brake teeth when the shaft is rotated, a hand crank fixed upon the forward end of the shaft, a tubular open end head formed on the crank and extending over the exposed end of the shaft and the end of the bearing, said tubular head providing a housing for a compressible coiled spring positioned over the shaft, said spring engaging at one end with the bearing end and at its opposite end with the crank whereby the shaft and its brake disc is constantly urged to interlocking engagement with the teeth of the housing.

2. The structure as recited in claim 1, wherein the brake disc is provided with a hexagonal centrally arranged opening for engaging over the shaft and a transversely extending pin passing through the shaft for limiting the outer sliding movement of the brake disc when in braking position under the influence of the axial movement by the spring.

3. The structure as recited in claim 1, wherein the tubular housing, bearing and shaft are horizontally disposed with respect to the attaching plates with the shaft and disc axially shiftable and rotatable.

ABRAHAM W. SCHOSTAK.

REFERENCES CITED

The following references are of record in the file of this patent:

UNITED STATES PATENTS

| Number | Name | Date |
|---|---|---|
| 146,776 | Nichols | Jan. 27, 1874 |
| 1,044,546 | Lee | Nov. 19, 1912 |
| 1,271,476 | Koehl | July 2, 1918 |
| 1,601,824 | Goldsmith | Oct. 5, 1926 |
| 1,632,763 | Kurscheidt et al. | June 14, 1927 |
| 1,676,441 | Jackson | July 10, 1928 |
| 1,856,069 | Dina | May 3, 1932 |
| 1,982,101 | Herbster | Nov. 27, 1934 |
| 2,284,996 | Stuckenholt | June 2, 1942 |